United States Patent
Hong et al.

(10) Patent No.: US 10,798,002 B2
(45) Date of Patent: Oct. 6, 2020

(54) DISTRIBUTED ANTENNA SYSTEM, FRAME PROCESSING METHOD THEREFOR, AND CONGESTION AVOIDING METHOD THEREFOR

(71) Applicant: SOLiD, INC., Seongnam-si, Gyeonggi-do (KR)

(72) Inventors: Hoo Pyo Hong, Gwacheon-si (KR); Dong Hee Kwon, Yongin-si (KR); Hee Hwan Kwak, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 16/077,906

(22) PCT Filed: Mar. 28, 2016

(86) PCT No.: PCT/KR2016/003145
§ 371 (c)(1),
(2) Date: Sep. 27, 2018

(87) PCT Pub. No.: WO2017/142125
PCT Pub. Date: Aug. 24, 2017

(65) Prior Publication Data
US 2019/0058662 A1    Feb. 21, 2019

(30) Foreign Application Priority Data

Feb. 16, 2016    (KR) .......................... 10-2016-0017590

(51) Int. Cl.
*H04L 12/801*    (2013.01)
*H04L 12/851*    (2013.01)
(Continued)

(52) U.S. Cl.
CPC .............. *H04L 47/12* (2013.01); *H04L 47/20* (2013.01); *H04L 47/24* (2013.01); *H04L 47/2441* (2013.01); *H04L 47/2483* (2013.01); *H04L 47/32* (2013.01); *H04L 67/322* (2013.01); *H04W 28/02* (2013.01);
(Continued)

(58) Field of Classification Search
None
See application file for complete search history.

(56) References Cited

U.S. PATENT DOCUMENTS 6,208,619 B1 *    3/2001    Takeuchi ................ H04L 47/10
                                                                 370/229
7,299,297 B2 *   11/2007    Brustoloni ......... G06Q 30/0601
                                                                 370/395.21
(Continued)

OTHER PUBLICATIONS

International Search Report for PCT/KR2016/003145 dated Nov. 8, 2016 [PCT/ISA/210].
(Continued)

*Primary Examiner* — Bunjob Jaroenchonwanit
(74) *Attorney, Agent, or Firm* — Sughrue Mion, PLLC

(57) ABSTRACT

According to one or more embodiments of the present invention, a frame processing method of a distributed antenna system may include confirming whether a quality of service (QoS) tag exists in header information of a received frame; performing frame scheduling of the frame based on the QoS tag; and dropping or transmitting the frame according to a transmission priority according to a result of the frame scheduling.

14 Claims, 13 Drawing Sheets

(51) Int. Cl.
*H04L 12/813* (2013.01)
*H04L 12/823* (2013.01)
*H04W 28/02* (2009.01)
*H04L 29/08* (2006.01)
*H04L 12/865* (2013.01)
*H04W 88/08* (2009.01)

(52) U.S. Cl.
CPC ..... *H04W 28/0242* (2013.01); *H04L 47/6275* (2013.01); *H04W 88/085* (2013.01)

(56) References Cited

U.S. PATENT DOCUMENTS

| | | | |
|---|---|---|---|
| 7,565,436 B2 | 7/2009 | Rabie et al. | |
| 8,451,722 B2* | 5/2013 | Isobe | H04L 47/10 370/230 |
| 9,386,474 B2* | 7/2016 | Ansley | H04W 24/06 |
| 9,713,167 B2* | 7/2017 | Kakadia | H04W 72/1257 |
| 10,103,950 B2* | 10/2018 | Fowler | H04L 43/028 |
| 2002/0058480 A1* | 5/2002 | Ikeda | H04L 29/06 455/67.11 |
| 2002/0126699 A1* | 9/2002 | Cloonan | H04L 12/2801 370/468 |
| 2004/0005859 A1* | 1/2004 | Ghercioiu | G06F 8/60 455/3.01 |
| 2004/0068668 A1* | 4/2004 | Lor | H04L 63/107 726/15 |
| 2004/0213151 A1* | 10/2004 | Willhite | H04L 12/5601 370/229 |
| 2005/0036497 A1* | 2/2005 | Kawakami | H04L 1/1838 370/395.21 |
| 2005/0144327 A1* | 6/2005 | Rabie | H04L 12/4641 709/249 |
| 2006/0176808 A1* | 8/2006 | Isobe | H04L 47/10 370/229 |
| 2009/0252206 A1* | 10/2009 | Rheinfelder | H03D 3/007 375/219 |
| 2011/0238242 A1* | 9/2011 | Nichter | B61L 27/0005 701/19 |
| 2011/0273988 A1* | 11/2011 | Tourrilhes | H04L 41/0816 370/237 |
| 2013/0010795 A1* | 1/2013 | Winchester | H04L 12/4633 370/392 |
| 2013/0030702 A1* | 1/2013 | Yamamoto | G01C 21/3685 701/533 |
| 2013/0254886 A1* | 9/2013 | Wang | H04L 63/1458 726/23 |
| 2013/0301539 A1* | 11/2013 | Aguirre | H04W 28/16 370/329 |
| 2013/0316673 A1* | 11/2013 | Goldner | H04L 12/1407 455/406 |
| 2013/0343192 A1* | 12/2013 | Kotecha | H04L 1/18 370/235 |
| 2014/0254390 A1* | 9/2014 | Ansley | H04W 24/10 370/241 |
| 2015/0010152 A1* | 1/2015 | Proulx | H04L 63/0428 380/255 |
| 2015/0141029 A1* | 5/2015 | Guttman | H04B 7/18513 455/452.1 |
| 2015/0172015 A1* | 6/2015 | Won | H04L 5/0035 370/329 |
| 2016/0007380 A1* | 1/2016 | Ito | H04W 72/0446 370/329 |
| 2016/0294648 A1* | 10/2016 | Fowler | H04L 43/028 |
| 2018/0103060 A1* | 4/2018 | Li | H04L 63/1458 |
| 2018/0220355 A1* | 8/2018 | Labbe | H04W 8/005 |

OTHER PUBLICATIONS

Carlos J.Bernardos (UC3M), "Final definition and evaluation of network-layer algorithms and network operation and management", INFSO-ICT-317941 iJOIN, Feb. 7, 2015, 58 pages.
Class of Service—Wikipedia, https://en.wikipedia.org/w/mdex.php?title=Class_of_service&oldid=704648203, Oct. 9, 2019, 2 pages.
Call Admission Control—Wikipedia, https://en.wikipedia.org/w/index.php?title=Call_Admission_Control&oldid=679147971, Oct. 9, 2019, 1 page.
Network congestion—Wikipedia, https://en.wikipedia.org/w/mdex.php?title=Network_congestion&oldid=704969373, Oct. 9, 2019, 9 pages.
Differentiated services—Wikipedia, https://en. wikipedia.org/w/index.php?title=Differentiated_services&oldid=698513318, Oct. 9, 2019, 8 pages.
Communication issued by the European Patent Office in corresponding European Patent Application No. 16890717.8-1213 / 3416339 dated Oct. 4, 2019.

* cited by examiner

FIG. 7

| Services | Service Type | Direction | Frame Dst Tag | Frame Classifier Rule | Frame Marking Rule (Frame QoS Tag) | Frame Policer Rule | Frame Scheduler Rule |
|---|---|---|---|---|---|---|---|
| RF Signal 1 | RF | Downlink | 100 | Frame Dst Tag 100 | 7 (Highest value) | - | SPQ Value: High |
| | | Uplink | 110 | Frame Dst Tag 110 | 7 (Highest value) | - | SPQ Value: High |
| RF Signal 2 | RF | Downlink | 200 | Frame Dst Tag 200 | 7 | - | SPQ Value: High |
| | | Uplink | 201 | Frame Dst Tag 201 | 7 | - | SPQ Value: High |
| CPRI Data 3 | CPRI | Downlink | 300 | Frame Dst Tag 300 | 6 | - | SPQ Value: Middle |
| | | Uplink | 300 | Frame Dst Tag 300 | 6 | - | SPQ Value: Middle |
| WiFi Data 4 | Ethernet | Downlink | 400 | No Rule | 1 (Lowest value) | Token Bucket CIR=100Mbps, CBS=1500Bytes, conforming frame action = Pass, non-conforming action=drop | WRR Rate: 1 |
| | | Uplink | 410 | No Rule | 1 (Lowest value) | Token Bucket CIR=20Mbps, CBS=1500Bytes, conforming frame action = Pass, non-conforming action=drop | WRR Rate: 1 |
| Smallcell Data 5 | Ethernet | Downlink | 500 | Dst IP address value 1.1.1.1 | 4 | - | WRR Rate: 5 |
| | | Uplink | 501 | Src IP address value 1.1.1.1 | 4 | - | WRR Rate: 5 |
| 1588v2 Data 6 | Ethernet | Downlink | 600 | IP TOS/DSCP value 7 | 6 | - | SPQ Value: Low |
| | | Uplink | 610 | IP TOS/DSCP value 7 | 6 | - | SPQ Value: Low |

FIG. 9

| Item | Type | Description |
|---|---|---|
| Port Number | Configured Value | Port Number |
| Max TX RF Frames | Configured Value | Maximum TX RF Frame Counts |
| Max RX RF Frames | Configured value | Maximum RX RF Frame Counts |
| TX RF Frames | Statistics Value | Transmitted RF Frame Counts |
| RX RF Frames | Statistics Value | Received RF Frame Counts |
| Dropped TX RF Frames | Statistics Value | Dropped TX RF Frame Counts (as a result of frame scheduler) |
| Dropped RX RF Frames | Statistics Value | Dropped RX RF Frame Counts (as a result of frame policer) |

FIG. 10

| Item | Type | Description |
|---|---|---|
| Port Number | Configured Value | Port Number |
| Max TX Ethernet Frames | Configured value | Maximum TX Ethernet Frame Counts |
| Max RX Ethernet Frames | Configured value | Maximum RX Ethernet Frame Counts |
| TX Ethernet Frames | Statistics Value | Transmitted Ethernet Frame Counts |
| RX Ethernet Frames | Statistics Value | Received Ethernet Frame Counts |
| Dropped TX Ethernet Frames | Statistics Value | Dropped TX Ethernet Frame Counts (as a result of frame scheduler) |
| Dropped RX Ethernet Frames | Statistics Value | Dropped RX Ethernet Frame Counts (as a result of frame policer) |

DISTRIBUTED ANTENNA SYSTEM, FRAME PROCESSING METHOD THEREFOR, AND CONGESTION AVOIDING METHOD THEREFOR

CROSS-REFERENCE TO RELATED APPLICATIONS

This application is a National Stage of PCT International Application No. PCT/KR2016/003145, filed Mar. 28, 2016, and claims priority from Korean Patent Application No. 10-2016-0017590, filed Feb. 16, 2016, the contents of which are incorporated herein by reference in their entireties.

BACKGROUND

1. Field

The present invention relates to a distributed antenna system, a frame processing method of the distributed antenna system, and a congestion avoiding method of the distributed antenna system, and more particularly, to a distributed antenna system for improving communication quality by efficient distribution of network resources, a frame processing method of the distributed antenna system, and a congestion avoiding method of the distributed antenna system.

2. Description of the Related Art

A distributed antenna system mainly relays a macro radio base station signal of a mobile communication service provider, but recently, supports a function of a backhaul transmission network capable of accommodating LTE/3G smallcell and WiFi as one of additional functions. The distributed antenna system may increase service capacity to increase user experience (UX) in terms of a bandwidth by supporting the function of the backhaul transmission network.

In terms of the distributed antenna system, an IP-based service such as a smallcell or WiFi, which is only one of the additional functions of the distributed antenna system, needs to use a bandwidth dynamically according to characteristics of traffic burstiness and congestion control is required. Therefore, the IP-based service in the distributed antenna system needs to have a relatively lower priority than a macro radio base station signal relay service.

When a backhaul transmission service for smallcell and WiFi is provided using a transmission network of the distributed antenna system without proper consideration of such a characteristic, network congestion due to excessive bandwidth usage is generated, thereby degrading the quality of a smallcell and WiFi service, and may even affect the quality of traffic for the macro radio base station signal relay service, which is a basic function of the distributed antenna system. This may cause degradation of basic functions of the distributed antenna system, a function stop, and the like.

SUMMARY

The present invention is directed to a distributed antenna system capable of improving communication quality by processing a priority of frames using a QoS tag and processing network congestion in advance or later in providing a smallcell and WiFi service, a frame processing method of the distributed antenna system, and a congestion avoiding method of the distributed antenna system.

According to an aspect of the present invention, a frame processing method of a distributed antenna system includes: confirming whether a quality of service (QoS) tag exists in header information of received frames; performing frame scheduling of the frames based on the QoS tag; and dropping or transmitting the frames according to a transmission priority according to a result of the frame scheduling.

According to an example embodiment, the frame processing method may further include marking, by the QoS tag, a value corresponding to the type of the frames when the QoS tag does not exist in the header information.

According to an example embodiment, the frame processing method may further include dropping the frames according to a frame policer related to transmission rate limitation of the frames.

According to an example embodiment, the frame processing method may further include allocating the frames to an output port corresponding to a destination tag of the header information.

According to an example embodiment, the performing of the frame scheduling may include aligning the frames allocated to the output port based on a QoS tag of each frame, and aligning frames having an identical QoS tag based on a frame scheduler rule.

According to another aspect of the present invention, a congestion avoiding method of a distributed antenna system includes: dropping or transmitting a frame based on a QoS tag of the frame; generating a congestion start event according to information accumulated by dropping or transmitting the frame; and processing a new call access denial or an existing call disconnection according to the congestion start event.

According to still another aspect of the present invention, a distributed antenna system includes: a system unit configured to drop or transmit a frame based on a quality of service (QoS) tag of the frame, and to generate a congestion start event according to information accumulated by dropping or transmitting the frame; and a distributed antenna system (DAS) management system configured to generate a request message for processing a new call access denial or an existing call disconnection according to the congestion start event.

According to an embodiment of the present invention, a distributed antenna system, a frame processing method of the distributed antenna system, and a congestion avoiding method of the distributed antenna system may improve quality of service through QoS management in a priority order when a backhaul transmission service is provided using a QoS policy.

Further, the distributed antenna system, the frame processing method of the distributed antenna system, and the congestion avoiding method of the distributed antenna system may improve communication quality by recognizing situations where congestion may occur or a congestion situation to deny the access of a new call or to disconnect the existing call in a smallcell base station or a WiFi AP related to a corresponding port.

BRIEF DESCRIPTION OF THE FIGURES

FIG. 7 is a table showing an example of information set for a frame processed in a distributed antenna system according to a QoS policy.

FIG. 9 is a table showing an example of information about RF frames stored per output port.

FIG. 10 is a table showing an example of information about Ethernet frames stored per output port.

DETAILED DESCRIPTION OF EXEMPLARY EMBODIMENTS

Figure 1:
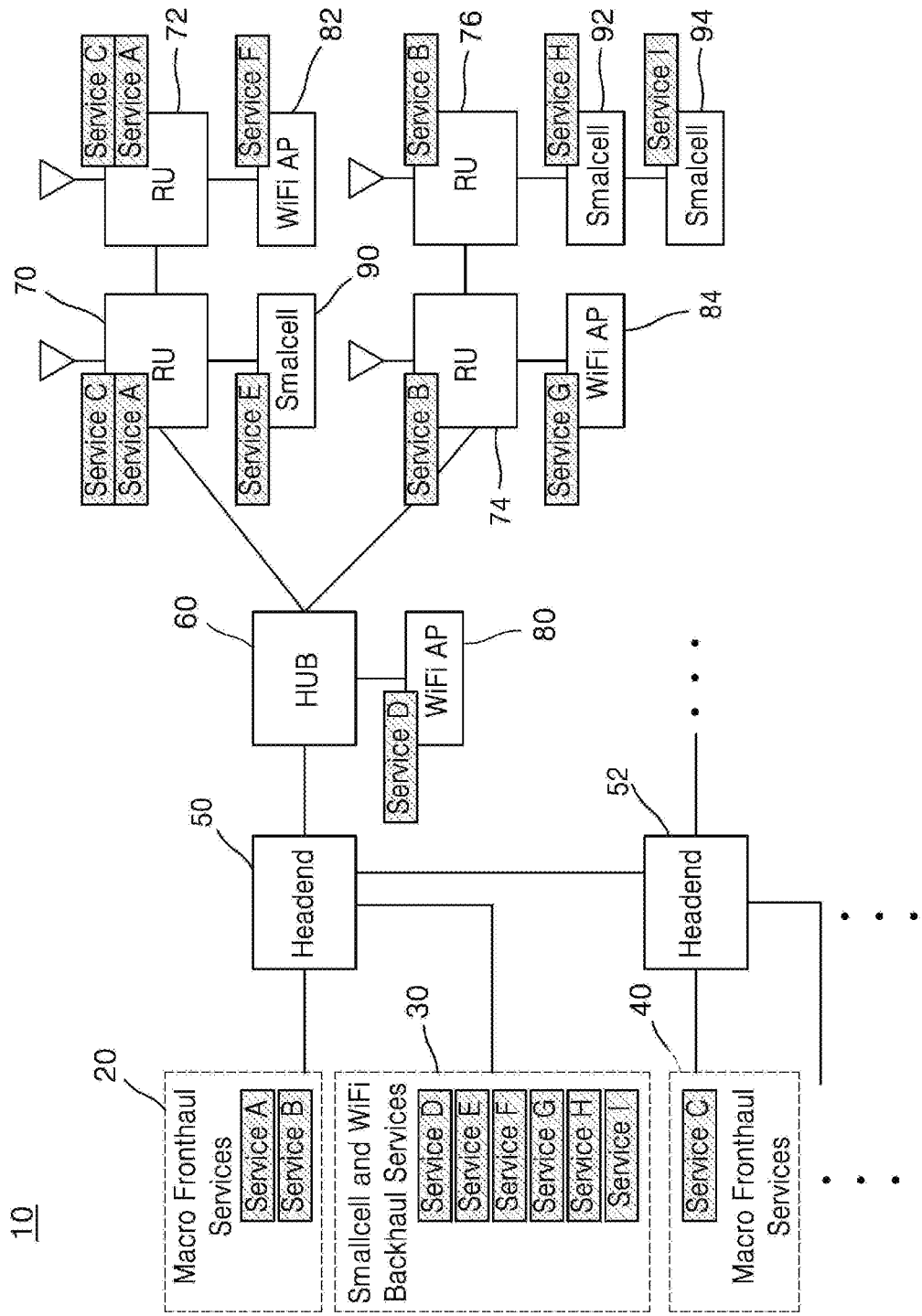
FIG. 1 is a view of a distributed antenna system according to an embodiment of the present invention.

Since the present invention may have diverse modified embodiments, preferred embodiments are illustrated in the drawings and are described in the detailed description. However, this does not limit the present invention within specific embodiments and it should be understood that the present invention covers all the modifications, equivalents, and replacements within the idea and technical scope of the present invention. In the description of the present invention, certain detailed explanations of the related art are omitted when it is deemed that they may unnecessarily obscure the essence of the present invention.

It will be understood that, although the terms first, second, etc. may be used herein to describe various elements, these elements should not be limited by these terms. These terms are only used to distinguish one element from another.

The terms used in this application, only certain embodiments have been used to describe, is not intended to limit the present invention. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Throughout the specification, a device may refer to a terminal, a mobile terminal (MT), a mobile station (MS), an advanced mobile station (AMS), a high-reliability mobile station (HR-MS), a subscriber station (SS), a portable subscriber station (PSS), an access terminal (AT), user equipment (UE), and the like. The device may also include all or some of functions of the terminal, MT, AMS, HR-MS, SS, PSS, AT, UE, and the like.

Furthermore, a base station (BS) may refer to an advanced base station (ABS), a high-reliability base station (HR-BS), node B (NodeB), evolved node B (eNodeB), an access point (AP), a radio access station (RAS), a base transceiver station (BTS), a mobile multihop relay (MMR)-BS, a relay station (RS) serving as a base station, a high-reliability relay station (HR-RS) serving as a base station, and the like. BS may also include all or some of functions of the ABS, NodeB, eNodeB, AP, RAS, BTS, MMR-BS, RS, HR-RS, and the like.

Embodiments of the present invention may be supported by standard documents disclosed in at least one of IEEE 802 systems, 3GPP systems, 3GPP LTE and LTE-Advanced (LTE-A) systems, and 3GPP2 systems, which are radio access systems. That is, operations or portions of the embodiments of the present invention that are not described may be supported by the documents in order to clearly illustrate the inventive concept. In addition, all terms disclosed herein may be described by the standard document. Hereinafter, embodiments of the present invention will be described in detail with reference to the accompanying drawings.

FIG. 1 is a view of a distributed antenna system according to an embodiment of the present invention.

Referring to FIG. 1, a distributed antenna system (DAS) 10 is a system utilizing a plurality of distributed antennas connected to a single base station via a wired or a dedicated line. The single base station manages a plurality of antennas located at a predetermined distance or more from each other in a cell served by the base station. In the point that the plurality of antennas are distributed and located at a predetermined distance or more from each other in a cell, the DAS 10 is distinguished from a centralized antenna system (CAS) in which a plurality of base station antennas are concentrated in the center of a cell. The CAS is a general cellular communication system such as wideband code division multiple access (WCDMA), high-speed packet access (HSPA), long-term evolution (LTE)/LTE-advanced (A), and 802.16, which employs various multi-antenna techniques such as open loop-multi input multi output (OL-MIMO), close loop-single user-multi input multi output (CL-SU-MIMO), close loop-multi user-multi input multi output (CL-MU-MIMO), multi-base station-multi input multi output (Multi-BS-MIMO) by installing multiple antennas in one base station in a cell-based structure.

The DAS is distinguished from a Femto cell in that units of each distributed antenna do not control the area of a corresponding antenna but control all distributed antenna areas located in a cell at a base station in a center of the cell. In addition, since the units of each distributed antenna are connected to each other by wire or by dedicated lines, the DAS is also distinguished from a multi-hop relay system in which a base station and an RS are wirelessly connected to each other or an ad-hoc network. In addition, since each distributed antenna may transmit a different signal to each terminal adjacent to the antenna according to a command from the base station, the DAS is also distinguished from a repeater structure that simply amplifies and transmits signals.

The DAS may be regarded as a kind of MIMO system in that distributed antennas may simultaneously transceive different data streams to support a single mobile station or multiple mobile stations. In terms of the MIMO system, the DAS may reduce a transmission power by reducing a transmission area for each antenna, compared with the CAS, due to antennas distributed at various positions in a cell. Furthermore, the DAS may increase transmission capacity and power efficiency of a cellular system by reducing path loss by shortening a transmission distance between an antenna and a terminal, thereby enabling high-speed data transmission, and may satisfy communication performance of a relatively uniform quality as compared with the CAS regardless of the position of a user in a cell. In addition, since a base station and a plurality of distributed antennas are connected to each other by wire or by dedicated lines, signal loss is small and correlation and interference between antennas are reduced. Therefore, the DAS may have a high signal-to-interference plus noise ratio (SINR).

The DAS 10 may include Headends 50/52, a HUB 60, and radio units (RUs) 70/72/74/76.

The Headends 50/52 are capable of receiving, digitizing, framing, and transmitting various radio signals. In addition, the Headends 50/52 receive Ethernet data, frame the Ethernet data, and transmit the Ethernet data to support a backhaul function. The Headends 50/52 add header information for data transmission when performing the framing, perform routing based on the header information, and transmit a corresponding frame to a destination port. Uplink traffic processing proceeds in a reverse order.

After receiving the frame, the HUB 60 transmits the frame to the destination port based on the header information. When the destination port is an Ethernet port, the HUB 60 performs a function of extracting Ethernet information from the frame and then switching the Ethernet information to support a backhaul function. The uplink traffic processing proceeds in a reverse order.

The RUs 70/72/74/76 receive the frame and then convert and transmit the frame to an RF signal based on the header information, transmit the frame to the destination port (in case of Daisy Chain), or when the destination port is an Ethernet port, extract the Ethernet information from the frame and then transmit the Ethernet information to corresponding WiFi APs 80/82/84 or smallcells 90/92/94 to support smallcell and WiFi. Uplink traffic processing proceeds in a reverse order.

Services provided by the DAS 10 may be classified into a macro fronthaul service (or radio over fiber (RoF)/fronthaul transmission services 20 and 40) and a smallcell/WiFi backhaul service 30.

The macro fronthaul services 20 and 40 mainly refer to a service that integrates one or more macro radio base station signals (CDMA, GSM, WCDMA, LTE etc.) and transmits the signals to the remote RUs 70/72/74/76 or vice versa. That is, the Headends 50/52 receive radio frequency (RF) signals and common public radio interface (CPRI) frames from various providers and transmit them to the plurality of RUs 70/72/74/76. The RF signals or the CPRI frames are transmitted by a transmission network of the DAS 10, and the RUs 70/72/74/76 restore the RF signals to original signals, convert the CPRI frames into the RF signals, and transmit the RF signals wirelessly.

The smallcell/WiFi backhaul service 30 is a service that transmits Ethernet packets to the WiFi APs 80/82/84 or the smallcells 90/92/94 connected to the HUB 60 or the RUs 70/72/74/76 using the transmission network of the DAS 10 or vice versa to support a smallcell or WiFi service.

As shown in the embodiment of FIG. 1, each of services A to C included in the macro fronthaul services 20 and 40 may be processed through any one of the RUs 70/72/74/76. In addition, each of services D to I included in the smallcell/WiFi backhaul service 30 may be processed through any one of the WiFi APs 80/82/84 or the smallcells 90/92/94.

The WiFi APs 80/82/84 and smallcells 90/92/94 may be dynamically connected to the HUB 60 and the RUs 70/72/74/76 for a backhaul service according to an installation environment and user's requirements. As the number of the installed WiFi APs 80/82/84 and smallcells 90/92/94 increases and users increase, congestion of backhaul services provided by the DAS 10 is inevitable, so that service efficiency needs to be improved through quality of service (QoS) management.

Figure 2:
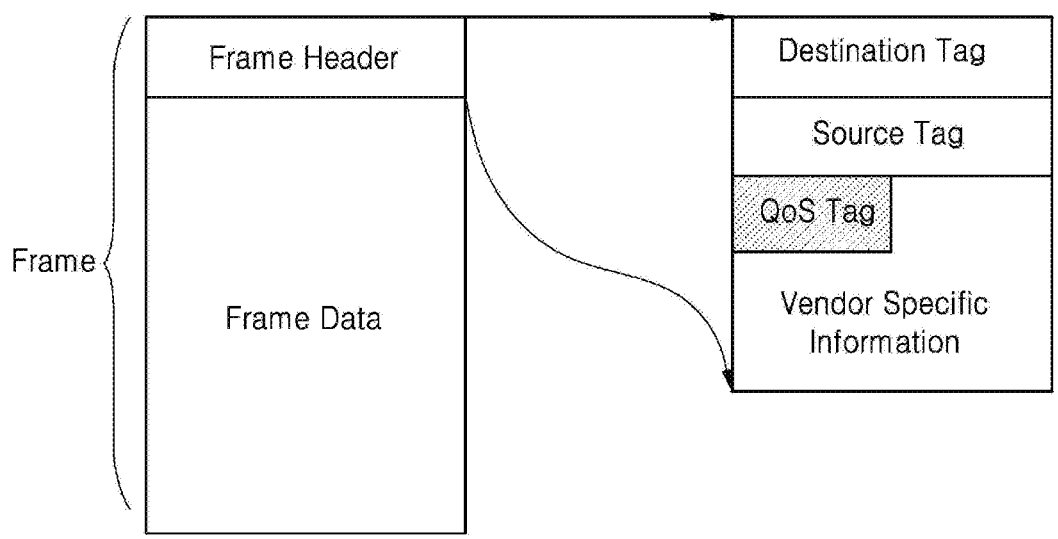
FIG. 2 is a view of a frame structure used in the distributed antenna system shown in FIG. 1.

FIG. 2 is a view of a frame structure used in the distributed antenna system shown in FIG. 1.

Referring to FIG. 2, each unit (Headend, HUB, and RU) of the DAS 10 frames and transmits received data for fronthaul and backhaul services. One frame may include a frame header and frame data.

The frame header may include a destination tag, a source tag, and vendor specific information as a part including information about a characteristic of a corresponding frame. The destination tag is a tag identifiable on a network of a configuration to which the frame is to be transmitted, and the source tag is a tag identifiable on a network of a configuration for transmitting the frame. In addition, the vendor specific information includes information that can be additionally set by a system administrator, and a QoS tag may be inserted in one embodiment of the present invention. The QoS tag performs the fronthaul or backhaul service to be performed for a corresponding frame in a priority order. For example, as a value stored in the QoS tag is higher, the corresponding frame may have a higher priority.

Each of the units (Headend, HUB, and RU) may transmit data by inserting the QoS tag when framing a macro radio base station signal, Ethernet packet, etc. received for priority processing of a frame.

The frame data refers to actual data to be transmitted to a final destination in the frame.

Figure 3:
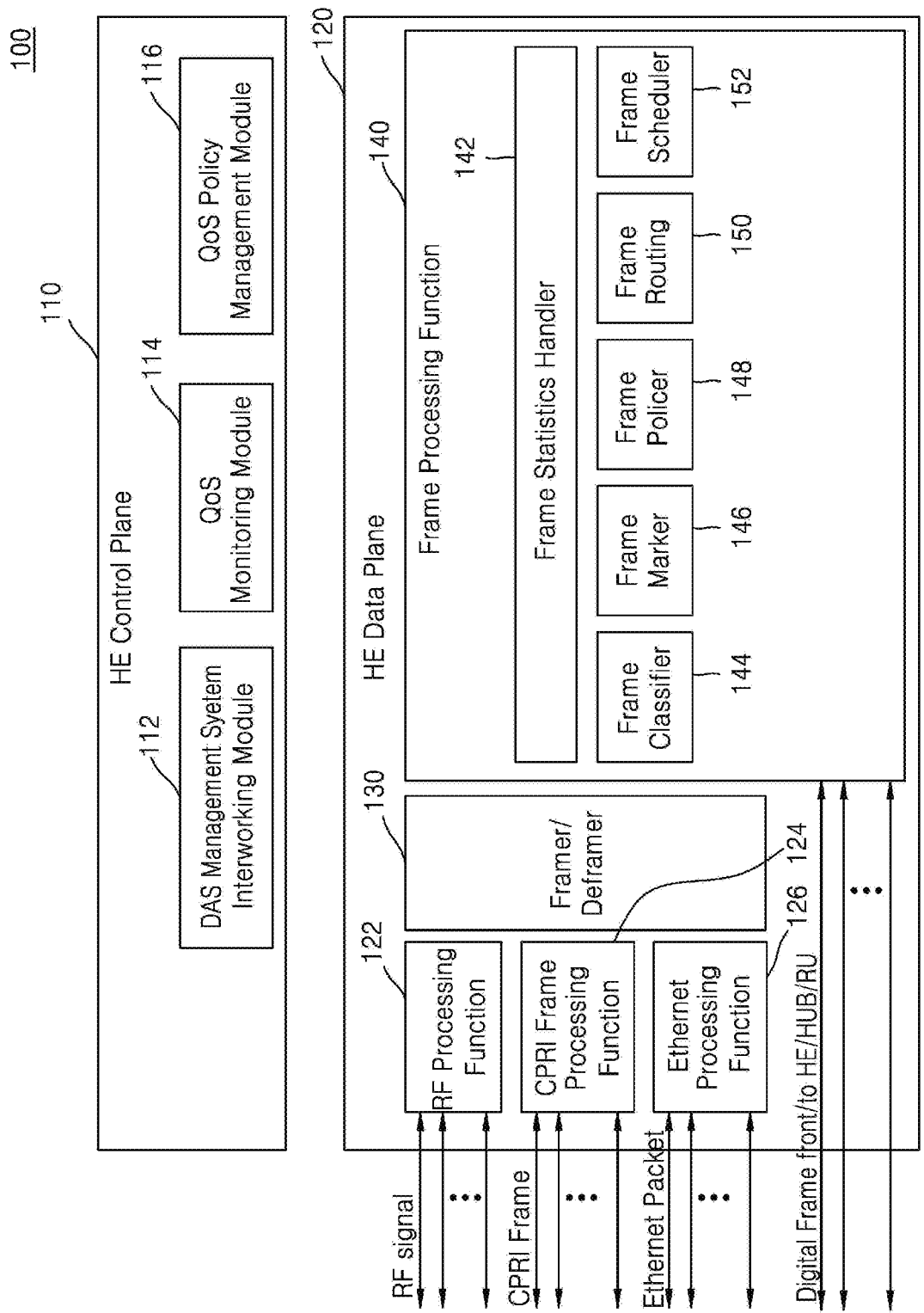
FIG. 3 is a more detailed block diagram of a Headend shown in FIG. 1.

FIG. 3 is a more detailed block diagram of the Headend shown in FIG. 1.

Referring to FIG. 3, the Headend 100 is a more detailed view of the Headend 50/52 shown in FIG. 1. The Headend 100 may include a control plane 110 (HE control plane) and a data plane 120 (HE data plane).

The control plane 110 may construct and store control information necessary for processing and transmitting a signal flowed into the Headend 100. The control plane 110 may include a DAS management system (DMS) interworking module 112, a QoS monitoring module 114, and a QoS policy management module 116.

Figure 11:
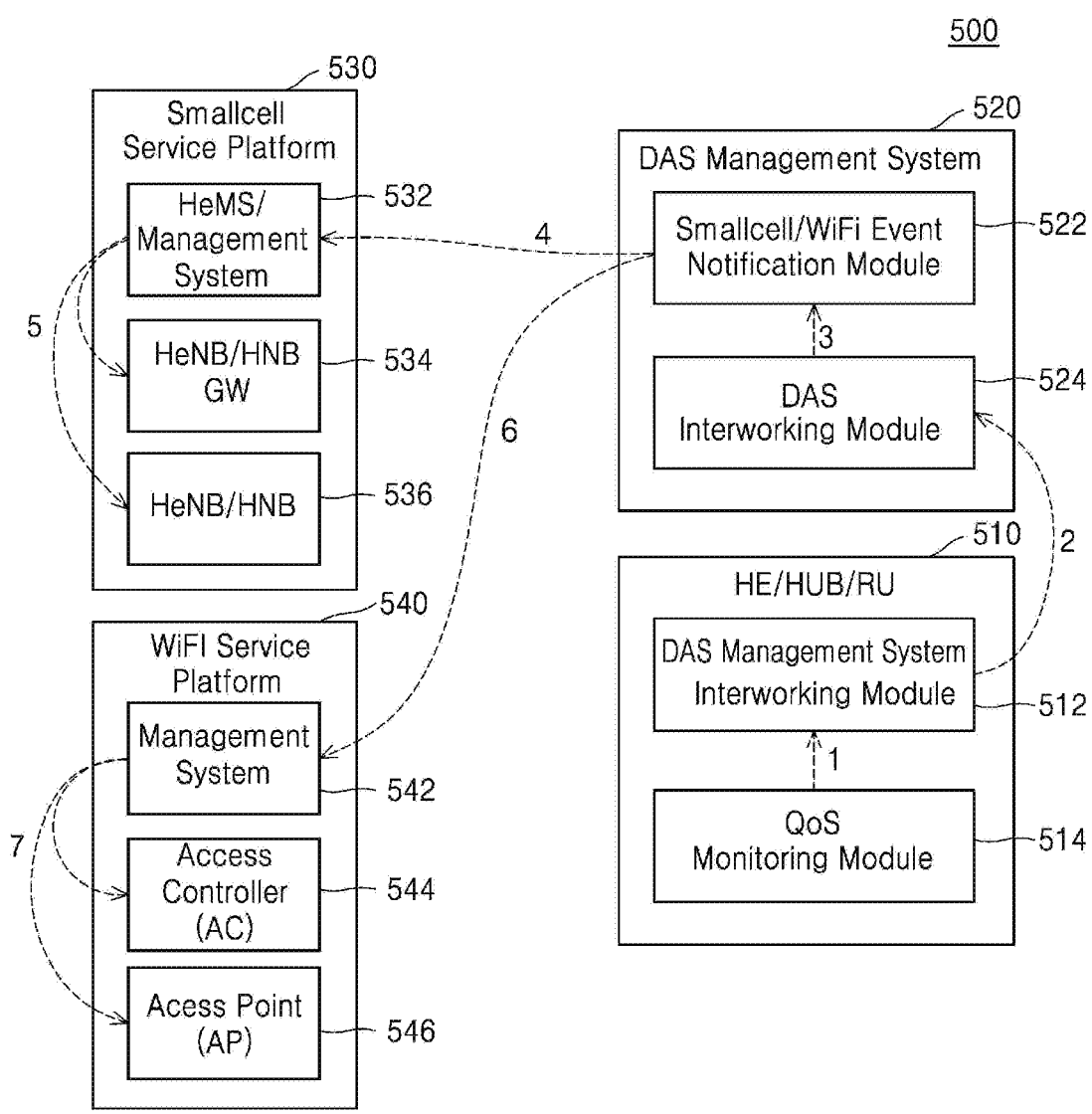
FIG. 11 is a block diagram for explaining a pre- or post-treatment for congestion in a distributed antenna system, according to an embodiment of the present invention.

The DMS interworking module 112 transmits an event and a data processing state in the Headend 100 to a DMS interworking module 520 (of FIG. 11). In particular, various forms of congestion or situations where congestion may occur detected by a frame processing function 140 are transmitted to the DMS interworking module 520 in an event format so as to be able to respond to service failures and quality reductions caused by congestion.

The QoS monitoring module 114 monitors information managed by a frame statistics handler 142 and may, when a congestion situation and/or situations where congestion may occur is detected, transmit the event to the DMS interworking module 112. This information will be described later with reference to FIG. 11.

The QoS policy management module 116 may receive a QoS policy from the DMS 520 and set the QoS policy such that a frame-based QoS may be managed.

The data plane 120 may interface, frame, and/or route a signal flowed into the Headend 100. The data plane 120 may include an RF processing function 122, a CPRI frame processing function 124, an Ethernet processing function 126, a framer/deframer 130, and a frame processing function 140.

The RF processing function 122 performs RF related processing such as analog to digital converting (ADC), digital to analog converting (DAC), and noise removal to receive or transmit an RF signal.

The CPRI frame processing function 124 may receive a CPRI frame and deframe the CPRI frame into CPRI data according to a CPRI protocol, or may receive the CPRI data and frame the CPRI data according to the CPRI protocol.

The Ethernet processing function 126 performs a switching function for an Ethernet packet for a smallcell and WiFi service.

The framer/deframer 130 may frame received RF signal, CPRI data, Ethernet packets, etc., or may deframe the framed data with the RF processing function 122, the CPRI frame processing function 124, or the Ethernet processing function 126 and transmit the deframed data. The framing is an operation of converting data into a format of the frame shown in FIG. 2, and the deframing is an operation of converting the frame into original data. The framer/deframer 130 may insert a destination tag when generating a frame.

The frame processing function 140 may process (classification, routing, priority processing, statistics collection, etc.) frames received from the framer/deframer 130 based on the QoS policy of the QoS policy management module 116. In addition, the frame processing function 140 may transceive a digital frame (i.e., a frame having the format of the frame shown in FIG. 2) with another Headend (HE), HUB, or RU without going through the framer/deframer 130.

The frame processing function 140 may include a frame statistics handler 142, a frame classifier 144, a frame marker 146, a frame policer 148, a frame routing 150, and a frame scheduler 152.

The frame statistics handler 142 may manage various frame statistics (frame reception, frame transmission, frame dropping, etc.) being processed in the frame processing function 140.

The frame classifier 144 may classify services of a received frame based on the QoS policy of the QoS policy management module 116. The frame classifier 144 may classify the frame into an RF signal, CRPI data, a frame transmitted from another Headend, and an Ethernet packet through a destination tag of frame header information. In addition, when the frame is an Ethernet packet, the frame may be further classified based on a 802.1p Cos field, IP TOS/DSCP, and 5tuple (source IP address, destination IP address, protocol field, TCP/UDP source port number, and TCP/UDP destination port number).

The frame marker 146 may insert a QoS tag into the frame classified by the frame classifier 144.

The frame policer 148 measures an inflow rate (e.g., unit: bps) of the Ethernet packet and prevents the Ethernet packet from being output beyond a preset bandwidth.

The frame routing 150 may determine an output port of the frame and route the output port to a corresponding port using the destination tag of the frame header information.

The frame scheduler 152 determines which frame is preferentially transmitted when congestion occurs. For example, the frame scheduler 152 may transmit a frame in a priority order using an algorithm such as strict priority queuing (SPQ), weighted fair queuing (WFQ), weighted round robin (WRR), and deficit weighted round robin (DWRR).

Figure 4:
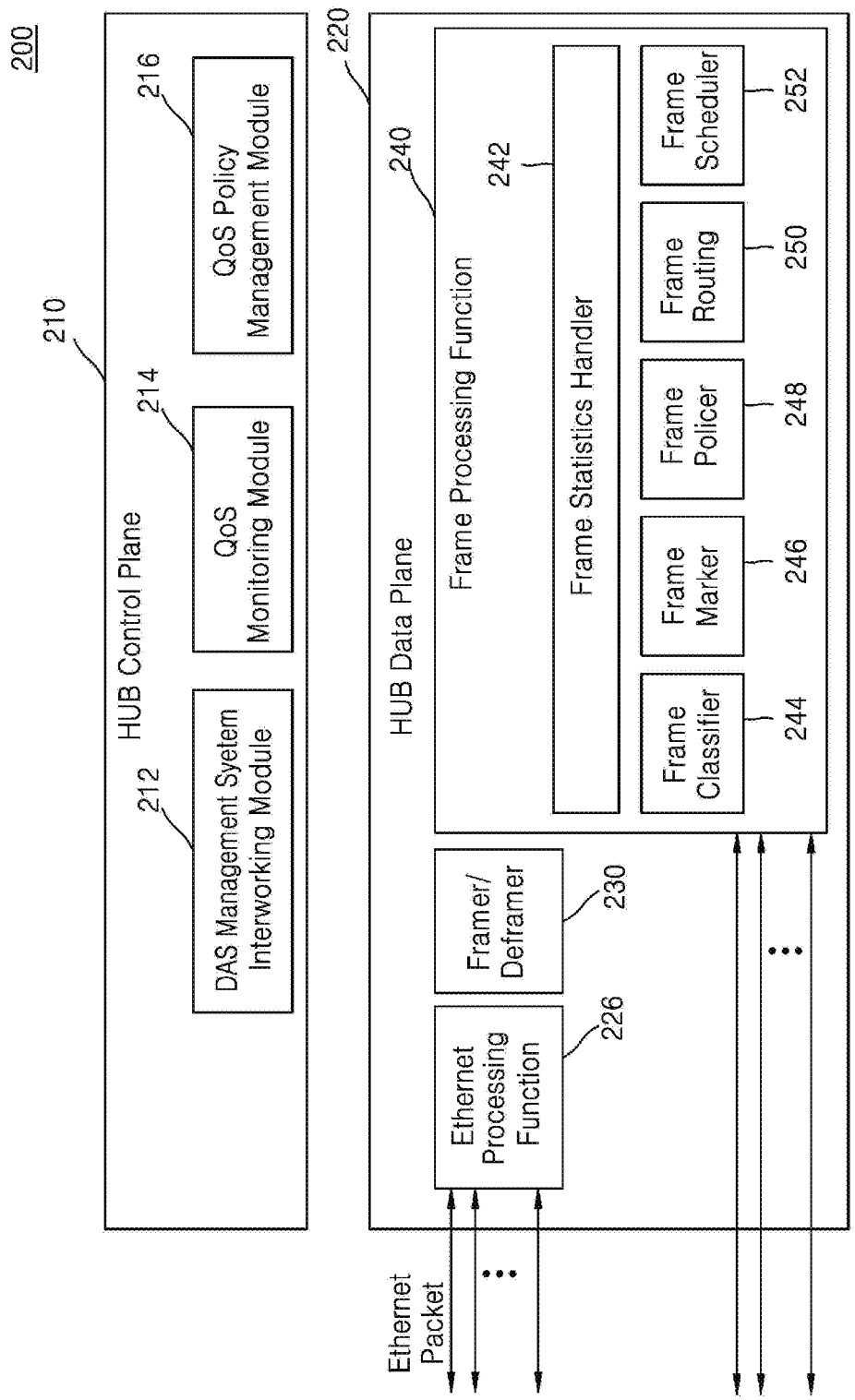
FIG. 4 is a more detailed block diagram of a HUB shown in FIG. 1.
Figure 5:
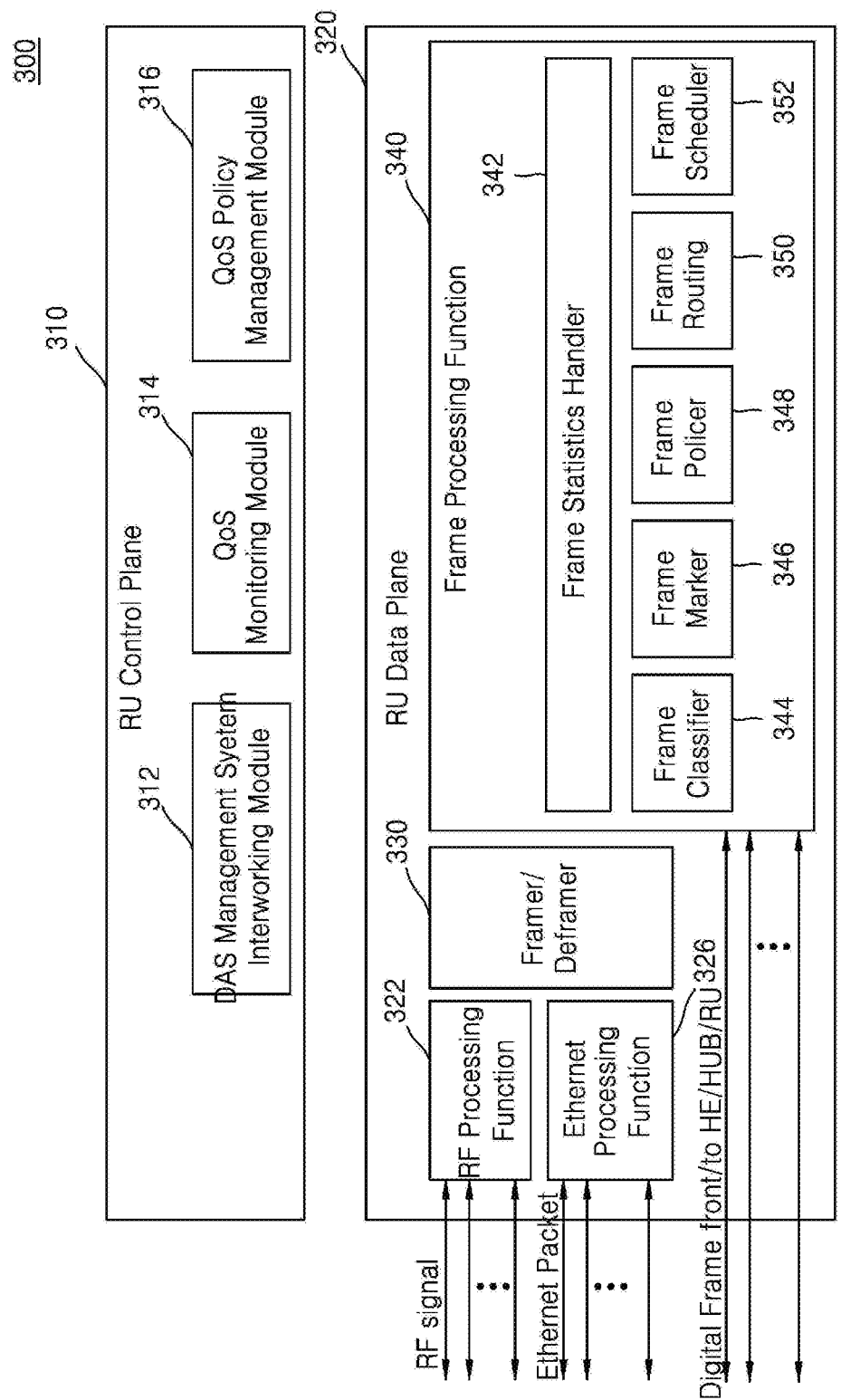
FIG. 5 is a more detailed block diagram of an RU shown in FIG. 1.

FIG. 4 is a more detailed block diagram of the HUB shown in FIG. 1 and FIG. 5 is a more detailed block diagram of the RU shown in FIG. 1.

Referring to FIG. 3, a HUB 200 is a more detailed view of the HUB 60 shown in FIG. 1. The HUB 200 may include a control plane 210 (HUB control plane) and a data plane 220 (HUB data plane). Configurations included in each of the control plane 210 and the data plane 220 may perform substantially the same functions as the configurations of the same name in FIG. 3.

However, the data plane 220 may not include the RF processing function 122 and the CPRI frame processing function 124 unlike the data plane 120 of FIG. 3. This is because the HUB 200 transmits a frame to a destination port between the Headend 50 and the RUs 70/72/74/76 based on header information without directly receiving an RF signal or a CPRI frame. In addition, since the WiFi AP 8 may be connected to the HUB 200, the HUB 200 may include an Ethernet processing function 226 for processing an Ethernet packet.

An RU 300 is a more detailed view of the RUs 70/72/74/76 shown in FIG. 1. The RU 300 may include a control plane 310 (RU control plane) and a data plane 320 (RU data plane).

Configurations included in each of the control plane 310 and the data plane 320 may perform substantially the same functions as the configurations of the same name in FIG. 3. However, the data plane 220 may not include the CPRI frame processing function 124 unlike the data plane 120 of FIG. 3. This is because the RU 300 receives framed CPRI data from the HUB 60 without receiving CPRI frame directly. Further, since the WiFi AP 80 or the smallcells 90/92/94 may be connected to the RU 300, the data plane 320 may include an Ethernet processing function 326 for processing an Ethernet packet and may further include an RF processing function 322 for transceiving RF signals.

Figure 6:
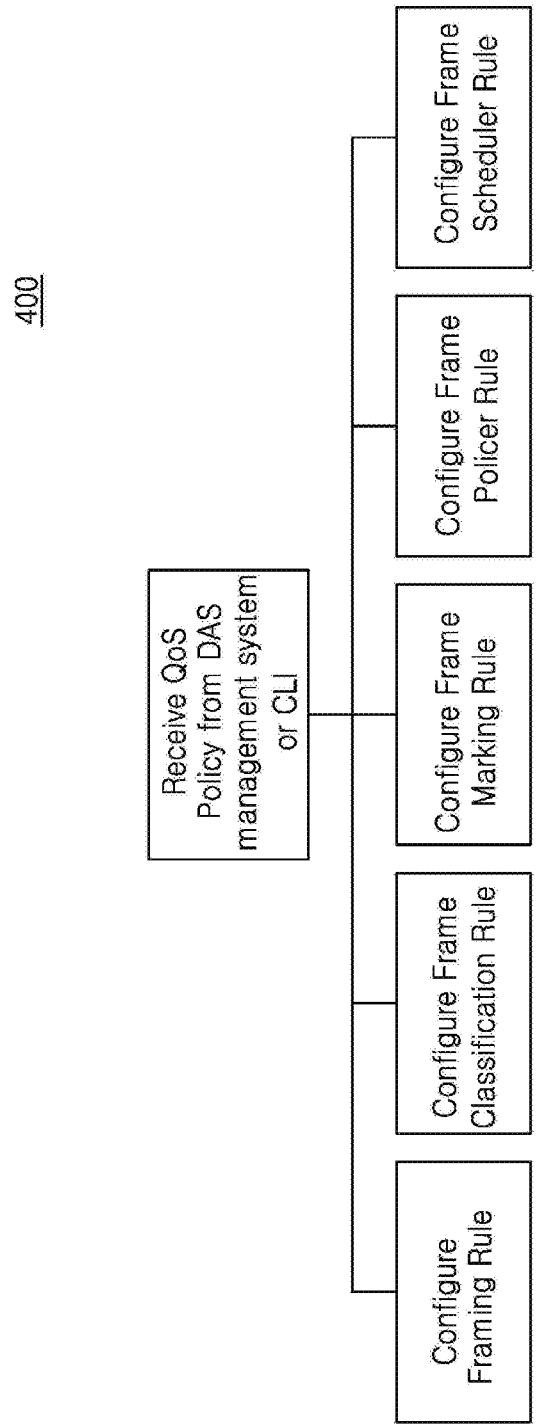
FIG. 6 is a view of information set for a frame processed in a distributed antenna system according to a QoS policy.

FIG. 6 is a view of information set for a frame processed in a distributed antenna system according to a QoS policy.

Referring to FIG. 6, although descriptions of FIGS. 6 to 10 are based on operations in the Headend 100 of FIG. 3, these operations may be applied substantially equally to the HUB 200 of FIG. 4 and the RU 300 of FIG. 5.

The QoS policy management module 116 may receive and set a QoS policy through the DMS 520, a command line interface (CLI), and/or a web Interface to manage a frame-based QoS (400). The QoS policy is a concept collectively referred to as a policy for determining processing (transmission, dropping, prioritization, etc.) of frames to improve quality of the macro fronthaul services 20 and 40 and the smallcell/WiFi backhaul service 30.

The QoS policy management module 116 controls the framer/deframer 130 and the frame processing function 140 according to the set QoS policy for QoS management. That is, each of the framer/deframer 130, the frame classifier 144, the frame marker 146, the frame policer 148, and the frame scheduler 152 may operate based on a framing rule, a frame classification rule, a frame marking rule, a frame policer rule, and a frame scheduler rule, which are determined according to the QoS policy.

In more detail, the framing rule is a rule that determines the size, position, and content of information (destination tag, source tag, vendor specific information, etc.) included in frame header information when a frame is generated by the framer/deframer 130.

The frame classification rule is a rule that determines information for identifying frames. The frame classification rule, which is a group of frame match parameters or frame classification rule IDs for identifying frames, may include at least one of a frame destination tag, a frame source tag, frame Ethernet information (e.g., Dst Eth address/mask, Src Eth address/mask, value, etc.), and frame IP information (e.g., Dst IP address/mask, Src IP address/mask, protocol, Dst port range, Src port range, and IP ToS/DSCP value). The frame classifier 144 may identify frames with a frame match parameter (or frame classification rule ID) of a corresponding frame through information matched in the frame classification rule.

The frame marking rule is a rule for determining a QoS tag, which is information about priority processing of a frame. When the frame match parameter (or frame classification rule ID) of the frame is X, the QoS tag is determined as Y corresponding to X. That is, the QoS tag of the frame is determined by the frame match parameter (or frame classification rule ID).

The frame policer rule is a rule that determines the limitation on a transmission rate. When the frame match parameter (or frame classification rule ID) of the frame is X, the frame policer rule is determined by limiting a transmission rate corresponding to X. Committed information rate (CIR), committed burst size (CBS), 'conforming frame action: pass', 'non-conforming frame action: drop', and the like are parameters included in the frame policer rule.

The frame scheduler rule is a rule related to information about priority processing of a frame like the QoS tag. However, the frame scheduler rule is a rule for determining a transmission priority among frames when a plurality of frames having an identical QoS tag are to be transmitted to one port. That is, the frame scheduler rule may be referred to as a port-based queue setting value, and may be set to one of 'Queue A: SPQ high', 'Queue B: Q middle', 'Queue C: SPQ low' 'Queue D: WRR weight 5', and 'Queue E: WRR weight 1'. Here, a priority order may be lowered from Queue A to Queue E.

The Headend 100 may perform QoS processing on a frame by setting rule information necessary for framing, rule information necessary for classification, marking rule information, policer rule information, scheduler rule information, and the like using the QoS policy.

FIG. 7 is a table showing an example of information set for a frame processed in a distributed antenna system according to a QoS policy.

Referring to FIG. 7, services are the name of service, a service type is a type of service, a direction is a data transmission direction (downlink/uplink), a frame destination tag (frame Dst tag) is the destination tag in FIG. 2, a frame classifier rule is a frame match parameter (or a frame classification rule ID), and a frame marking rule is the QoS tag in FIG. 2. A frame policer rule and a frame scheduler rule are as described in FIG. 6.

When service names for each frame are RF signal 1, RF signal 2, CPRI data 3, WiFi data 4, smallcell data 5, and 1588v2 data 6, the service types of each frame are RF, RF, CPRI, Ethernet, Ethernet, and Ethernet.

In each frame, a destination tag, which is identification information of a destination to be transmitted, is included in the frame header. A frame match parameter (or frame classification rule ID) of an RF signal and CPRI data includes information about the destination tag (e.g., frame Dst Tag 100). Meanwhile, a separate frame match parameter (or frame classification rule ID) may not be set for WiFi data 4. For smallcell data 5 and 1588v2 data 6, the frame match parameter (or frame classification rule ID) may be set to be a Dst IP address value, a Src IP address value, an IP TOS/DSCP value, and the like.

Based on the frame marking rule, a value of the QoS tag may be determined according to the frame match parameter (or frame classification rule ID) for each frame. For example, the QoS tag for the RF signal may be set to the highest 7, and the QoS tag for WiFi data 4 may be set to the lowest 1.

In particular, for WiFi data 4, transmission rate limitation may be set by the frame policer rule. For example, CIR, CBS, etc. may be set for variables determining a token bucket for WiFi data 4.

As in the description of FIG. 6, the frame scheduler rule for each frame may be set to one of 'Queue A: SPQ high', 'Queue B: Q middle', 'Queue C: SPQ low', 'Queue D: WRR weight 5', and 'Queue E: WRR weight 1'. For example, when CPRI data 3 and 1588v2 data 6 having an identical QoS tag on an identical port compete with each other, CPRI data 3 having a higher priority according to a scheduler rule may be transmitted.

Here, information about the service type, direction, frame match parameter (or frame classification rule ID), QoS tag, frame policer rule, and frame scheduler rule may be included in the vendor specific information in FIG. 2, but the present invention is not limited thereto.

Figure 8:
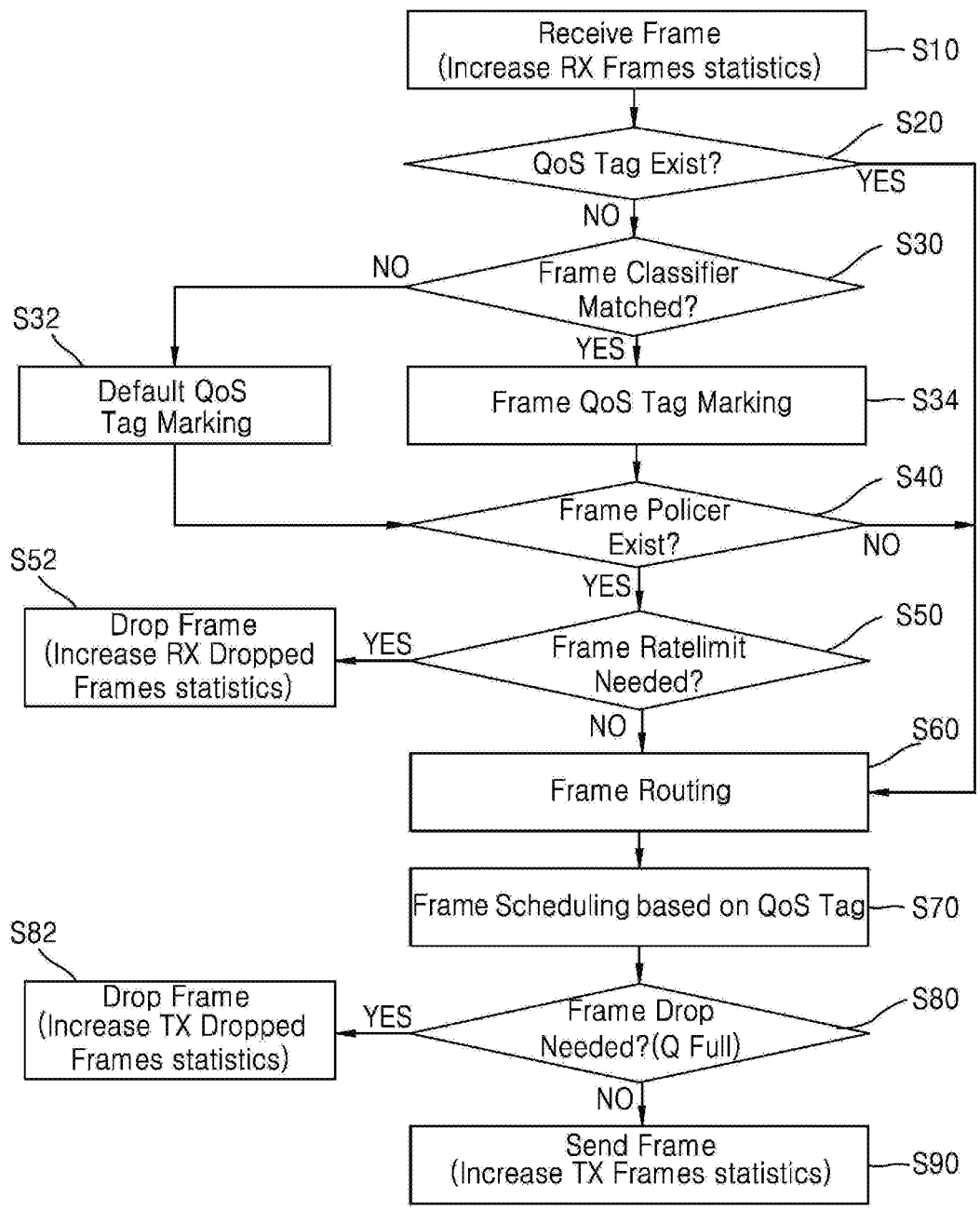
FIG. 8 is a view of a specific processing procedure for a frame performed in a distributed antenna system according to a QoS policy.

FIG. 8 is a view of a specific processing procedure for a frame performed in a distributed antenna system according to a QoS policy.

Referring to FIG. 8, the frame processing function 140 may receive a frame from the outside (e.g., framer/deframer 130) (S10).

The frame processing function 140 determines whether a QoS tag is included in the frame (S20). When the QoS tag is included in the frame (Yes in operation S20), the frame processing function 140 may proceed to operation S60.

When the QoS tag is not included in the frame (No in operation S20), the frame processing function 140 may determine whether information that matches a frame classification rule ID of the frame exists in a frame classification rule.

When information that matches the frame classification rule ID of the frame exists in the frame classification rule (Yes in operation S30), the frame processing function 140 may insert a value according to the information that matches the frame classification rule ID of the frame into the QoS tag (S34).

When information that matches the frame classification rule ID of the frame does not exist in the frame classification rule (No in operation S30), the frame processing function 140 may insert a default Qos tag into the QoS tag (S34). The default QoS tag may be a predetermined value and may be an intermediate value (e.g., 4) in a range of values that the QoS tag may have because the default QoS tag cannot identify the type of the frame, but the scope of the present invention is not limited thereto.

When the QoS tag is determined in operations S32 and S34, the frame processing function 140 may determine whether a frame policer rule of the frame exists (S40).

When a frame policer rule of the frame does not exist (No in operation S40), the subsequent operation S60 may be performed.

When the frame policer rule of the frame exists (Yes in operation S40), the frame processing function 140 may determine whether transmission rate limitation is necessary according to the frame policer rule of the frame (S50). For example, when the frame is WiFi data 4 in FIG. 7, the frame processing function 140 may determine whether to process WiFi data according to the state of a token bucket when receiving the WiFi data. When an action determined by the state of the token bucket when receiving the WiFi data is drop, the frame processing function 140 may perform transmission rate limitation for the frame.

When the transmission rate limitation is not necessary according to the frame policer rule of the frame (No in operation S50), the subsequent operation S60 may be performed.

When transmission rate limitation is necessary according to the frame policer rule of the frame (Yes in operation S50), the frame processing function 140 may drop the frame (S52).

The frame processing function 140 may allocate and route output ports according to a destination tag of a frame header of the frame (S60).

The frame processing function 140 may perform frame scheduling based on a QoS tag for the frame to which the output ports are allocated (S70). The frame scheduling may refer to an operation of determining a frame transmission order by aligning at least one frame allocated to an identical output port based on a QoS tag of each frame.

In the frame scheduling, the higher a priority of the QoS tag, the higher a priority of the frame transmission order. However, a transmission order for frames having an identical QoS tag may be determined based on the frame scheduler rule of FIG. 7.

The frame processing function 140 may determine whether dropping is necessary for at least one frame in which a transmission order is determined (S80). That is, when all transmission queues of a corresponding output port are filled, the frame processing function 140 may determine that dropping is necessary for a frame to which queues are not allocated.

When dropping is necessary for the frame (Yes in operation S80), the frame processing function 140 may drop the frame (S82).

When dropping is not necessary for the frame (No in operation S80), the frame processing function 140 may transmit the frame to the outside (S84).

The frame processing function 140 may perform frame processing in a priority order by performing frame-by-frame scheduling based on a QoS tag included in the frame.

The distributed antenna system 10 according to an embodiment of the present invention, the quality of service through QoS management in a priority order may be improved when a backhaul transmission service is provided using a QoS policy.

In addition, a function of dynamically adjusting a traffic transmission rate for a fronthaul service and a backhaul service to suit an optimal environment by a QoS policy during a service operation.

FIG. 9 is a table showing an example of information about RF frames stored per output port. FIG. 10 is a table showing an example of information about Ethernet frames stored per output port.

Referring to FIGS. 9 and 10, while the processing of the frame shown in FIG. 8 is performed, the frame statistics handler 142 may manage frame statistics per output port and per frame type.

The frame statistics handler 142 may store information about RF frames per output port as shown in FIG. 9.

The information may include a port number, maximum transmitted RF frame counts (Max TX RF frames), maximum received RF frame counts (Max RX RF frames), transmitted RF frame counts (TX RF frames), received RF frame counts (RX RF frames), dropped transmitted RF frame counts (Dropped TX RF frames), and dropped received RF frame counts (Dropped TX RF frames).

The port number, the maximum transmitted RF frame counts, and the maximum received RF frame counts are configured values that are determined in advance according to specifications of an output port. Each of the transmitted RF frame counts, the received RF frame counts, the dropped transmitted RF frame counts, and the dropped received RF frame counts are a statistics value that is statistically collected during the processing of the frame shown in FIG. 8, and are a value that can be reset a predetermined period.

The port number is a serial number for identifying a corresponding port.

The maximum transmitted RF frame counts or the maximum received RF frame counts refer to the number of RF frames that a corresponding port may transmit or receive at maximum during a certain period of time.

The transmitted RF frame counts or the received RF frame counts refer to the number of RF frames transmitted or received during a certain period of time.

The dropped transmitted RF frames or the dropped received RF frame counts refer to the number of dropped transmitted RF frames or dropped received RF frames during a certain period of time. Here, the received RF frame refers to a frame before an output port is determined by the routing in operation S60 of FIG. 8, and a transmitted RF frame refers to a frame after the output port is determined by the routing.

In FIG. 8, the received RF frame counts are determined (when RF frames are received, the received RF frame counts are increased by 1) by operation S10, the dropped received RF frame counts are determined (when received RF frames are dropped, the dropped received RF frame counts are increased by 1) by operation S52, the dropped transmitted RF frame counts are determined (when transmitted RF frames are dropped, the dropped transmitted RF frame counts are increased by 1) by operation S82, and the transmitted RF frame counts are determined (when RF frames are dropped, the received RF frame counts are increased by 1) by operation S90.

Furthermore, the frame statistics handler 142 may store information about Ethernet frames per output port as shown in FIG. 10.

The information may include a port number, maximum transmitted Ethernet frame counts (Max TX Ethernet frames), maximum number of received Ethernet frame counts (Max RX Ethernet frames), transmitted Ethernet frame counts (TX Ethernet frames), received Ethernet frame counts (RX Ethernet frames), dropped transmitted Ethernet frame counts (Dropped TX Ethernet frames), and dropped received Ethernet frame counts (Dropped RX Ethernet frames).

A meaning and a generation process of each of the port number, the maximum transmitted Ethernet frame counts, the maximum number of received Ethernet frame counts, the transmitted Ethernet frame counts, the received Ethernet frame counts, the dropped transmitted Ethernet frame counts, and the dropped received Ethernet frame counts for Ethernet frames are substantially the same as those of each of the port number, the maximum transmitted RF frame counts, the maximum received RF frame counts, the transmitted RF frame counts, the received RF frame counts, the dropped transmitted RF frame counts, and the dropped received RF frame counts for RF frames, so that repeated description thereof will be omitted.

FIG. 11 is a block diagram for explaining a pre- or post-treatment for congestion in a distributed antenna system, according to an embodiment of the present invention.

Referring to FIG. 11, a distributed antenna system 500 may include a system unit 510 of a Headend, a HUB, or an RU, a DMS 520, a smallcell service platform 530, and a WiFi service platform 540.

The distributed antenna system 500 is substantially the same as the DAS 10 shown in FIG. 1, but is merely shown to include a configuration necessary to explain the pre- or post-treatment for congestion.

A system unit 510 may be any one of the Headend, the HUB, and the RU, and may include a DMS interworking module 512 and a QoS monitoring module 514. The DMS interworking module 512 and the QoS monitoring module 514 have substantially the same configuration as the DMS interworking module 112 and the QoS monitoring module 114 of FIG. 3.

The DMS 520 may include a smallcell/WiFi event notification module 522 for informing a smallcell service platform 530 and a WiFi service platform 540 of events related to congestion, and a DAS interworking module 524 for receiving the events in cooperation with the DAS interworking module 512.

The distributed antenna system 500 providing a backhaul service performs a simple transport network function in view of a smallcell base station (e.g., 90 in FIG. 1) or a WiFi AP (e.g., 80 in FIG. 1). Therefore, in order to provide a smallcell service or a WiFi service, in addition to a smallcell base station or a WiFi AP for signal transmission, additional network elements that can be serviced and managed by integrating a plurality of smallcell base stations and WiFi APs.

Therefore, as specified in a 3GPP standard, the smallcell service platform 530 providing a smallcell service may include a smallcell (also referred to as Home eNB, HeNB, HNB or the like) base station 536, an HeNB/HNB gateway 534, which is an integrated signaling gateway for a plurality of base stations, and a Home eNB management system (HeMS) 532 for managing a smallcell base station.

Furthermore, the WiFi service platform 540 providing a WiFi service may include a WiFi AP 546, an access controller (AC) 544 for providing an integrated management system in terms of access control, and a management system 542 capable of managing a plurality of APs and ACs.

The QoS monitoring module 514 may monitor information (e.g., information shown in FIGS. 9 and 10) per output port managed by the frame statistics handler 142 to detect a congestion situation or situations where congestion may occur.

That is, the QoS monitoring module 514 may monitor an Ethernet bandwidth usage rate in units of output ports and determine that congestion may occur when frame processing for a corresponding port is continued for a certain rate (a first threshold value and more) and for a certain period of time, and may generate a congestion prediction event. The Ethernet bandwidth usage rate may be defined as a value obtained by dividing the transmitted Ethernet frame counts by the maximum transmitted Ethernet frame counts in FIG. 10. The Ethernet bandwidth usage rate is a ratio of a current output frame to a maximum output bandwidth of a corresponding port, and may be a criterion for a concern that congestion may occur in the future.

Furthermore, the QoS monitoring module 514 may monitor the dropped transmitted Ethernet frame counts in FIG. 10 in units of output ports and determine that it is a congestion situation when a frame to be dropped for a corresponding port continues for a certain rate (a second threshold value and more) and for a certain period of time, and may generate a congestion event. The dropped transmitted Ethernet frame counts refers to the number of frames dropped due to congestion occurrence, so it may be determined whether congestion occurs based on the dropped transmitted Ethernet frame counts.

According to an embodiment, whether the congestion prediction event or the congestion event is generated by the QoS monitoring module 514 may be preset by a system administrator.

The QoS monitoring module 514 may generate a congestion prediction event or a congestion event and transmit the congestion prediction event or the congestion event to the DMS interworking module 512 (1).

The DMS interworking module 512 may generate a congestion prediction event or a congestion event and transmit the congestion prediction event or the congestion event to the DAS interworking module 524 (2).

The smallcell/WiFi event notification module 522 may receive a congestion prediction event or a congestion event from the DAS interworking module 524 (3).

The smallcell/WiFi event notification module 522 may determine which smallcell service platform or WiFi service platform to request processing according to a congestion prediction event or a congestion event, based on port information (e.g., a port number) included in the congestion prediction event or the congestion event.

For example, when the port information indicates a port of the HUB 60 connected to the WiFi AP 80, the smallcell/WiFi event notification module 522 may determine to request the WiFi service platform 540 to process a corresponding event.

When a target to be processed is the smallcell service platform 530 and the smallcell/WiFi event notification module 522 receives a congestion prediction event, the smallcell/WiFi event notification module 522 may request the smallcell service platform 530 to deny the access of a new call (4).

Otherwise, when a target to be processed is the smallcell service platform 530 and the smallcell/WiFi event notification module 522 receives a congestion event, the smallcell/WiFi event notification module 522 may request the smallcell service platform 530 to disconnect an existing call (4).

The management system 532, which has received a new call access denial or an existing call disconnection, may control the smallcell base station 536 and/or the HeNB/HNB gateway 534 to process the new call access denial or the existing call disconnection (5).

According to an embodiment, the management system 532 may perform the new call access denial or the existing call disconnection using an overload control message which is an S1-MME message.

According to another embodiment, the management system 532 may perform the new call access denial or the existing call disconnection on the smallcell base station 536 and/or the HeNB/HNB gateway 534 through its own application programming Interface (API) definition.

When a target to be processed is the WiFi service platform 540 and the smallcell/WiFi event notification module 522 receives a congestion prediction event, the smallcell/WiFi event notification module 522 may request the WiFi service platform 540 to deny the access of a new call (6).

Otherwise, when a target to be processed is the WiFi service platform 540 and the smallcell/WiFi event notification module 522 receives a congestion event, the smallcell/WiFi event notification module 522 may request the WiFi service platform 540 to disconnect an existing call (6).

The management system 542, which has received a new call access denial or an existing call disconnection, may control the AC 544 and/or the WiFi AP 546 to process the new call access denial or the existing call disconnection.

According to an embodiment, the management system 542 performs the new call access denial or the existing call disconnection on the AC 544 and/or the WiFi AP 546 through its own API definition.

Here, in the new call access denial or the existing call disconnection, a priority order according to user information (e.g., a rate plan) and bandwidth consumption of a user for a certain period of time may be considered.

Therefore, the distributed antenna system 500 according to an embodiment of the present invention, a smallcell base station or a WiFi AP associated with a corresponding port does not further process a new cell when situations where congestion may occur are recognized, thereby preventing frame dropping due to congestion in advance and improving communication quality for a smallcell service or a WiFi service.

In addition, it is possible to quickly recover from a congestion situation by disconnecting a user call with a low priority or high bandwidth consumption in a smallcell base station or a WiFi AP associated with a corresponding port when a congestion situation is recognized, thereby improving communication quality for a smallcell service or a WiFi service.

Figure 12:
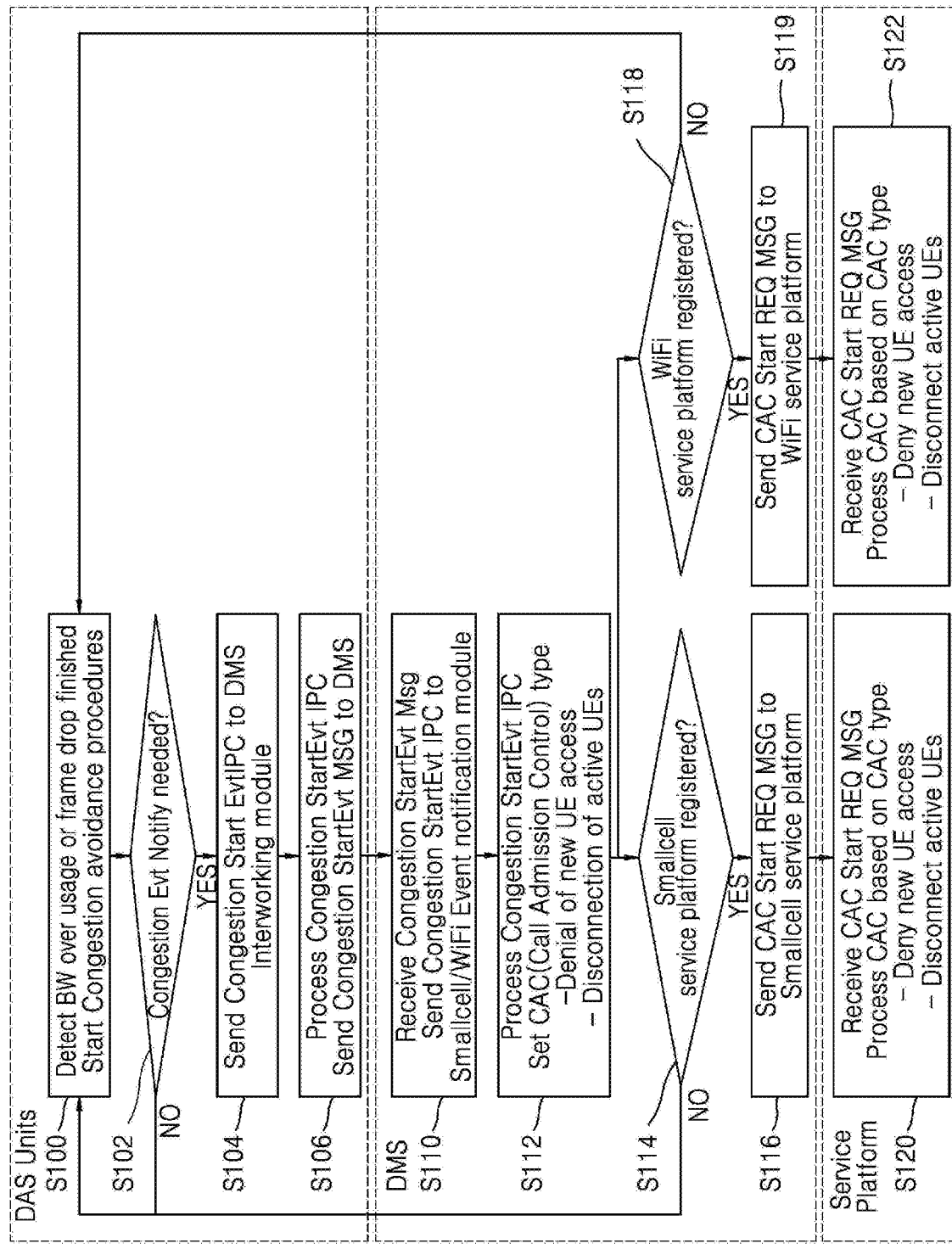
FIG. 12 is a more detailed flowchart of the start of a pre- or post-treatment for congestion in a distributed antenna system, according to an embodiment of the present invention.

FIG. 12 is a more detailed flowchart of the start of a pre- or post-treatment for congestion in a distributed antenna system, according to an embodiment of the present invention.

Referring to FIGS. 11 and 12, the QoS monitoring module 514 may monitor an Ethernet bandwidth usage rate (BW over usage) and dropped transmitted Ethernet frame counts (frame dropping) per output port and generate a congestion prediction event or a congestion event according to the monitoring result, thereby starting a congestion avoiding procedure (S100). Here, the congestion prediction event or the congestion event is referred to as a congestion start event (congestion start Evt) for starting a new call access denial or an existing call disconnection.

The QoS monitoring module 514 may determine whether to transmit the congestion start event to the DMS 520 (S102). When it is not necessary to transmit the congestion start event to the DMS 520 (No in operation S102, for example, when it is determined that the situation is very temporary), operation S100 may be performed again.

When it is necessary to transmit a congestion start event to the DMS 520 (Yes in operation S102), the QoS monitoring module 514 may transmit congestion start event inter-processor communication (IPC) to the DMS interworking module 512 (S104).

The DMS interworking module 512 may process (protocol conversion) the congestion start event IPC to generate a congestion start event message (MSG) and transmit the congestion start event MSG to the DMS 520 (S106).

The DAS interworking module 524 of the DMS 520 may receive the congestion start event MSG and transmit the congestion start event IPC according to the congestion start event MSG to the smallcell/WiFi event notification module 522 (S110).

The smallcell/WiFi event notification module 522 may set a call admission control (CAC) type according to whether the congestion start event IPC is a congestion prediction event or a congestion event (S112). The CAC type may be a new call access denial (a denial of new UE access) or an existing call disconnection (a disconnection of active UEs).

The smallcell/WiFi event notification module 522 may determine which smallcell service platform or WiFi service platform to request processing according to a congestion prediction event or a congestion event, based on port information of the congestion start event IPC.

The smallcell/WiFi event notification module 522 determines whether the determined smallcell service platform is registered in the distributed antenna system 500 (S114), and when the determined smallcell service platform is not registered in the distributed antenna system 500 (No in operation S114), operation S100 may be performed again.

The determined smallcell service platform is registered in the distributed antenna system 500 (Yes in operation S114), the smallcell/WiFi event notification module 522 may transmit a CAC start request message (CAC start REQ MSG) to the smallcell service module 522 (S116).

The CAC start request message is a message for requesting a new call access denial or an existing call disconnection, and may include a CAC type, port information, and the like.

The management system 532 receiving the CAC start request message may control the smallcell base station 536 and/or the HeNB/HNB gateway 534 to process a new call access denial or an existing call disconnection according to the CAC type (S120).

The smallcell/WiFi event notification module 522 determines whether the determined WiFi service platform is registered in the distributed antenna system 500 (S118), and when the determined WiFi service platform is not registered in the distributed antenna system 500 (No in operation S118), operation S100 may be performed again.

When the determined WiFi service platform is registered in the distributed antenna system 500 (Yes in operation S118), the smallcell/WiFi event notification module 522 may transmit the CAC start request message to the WiFi service platform 540 (S119).

The management system 542 receiving the CAC start request message may control the AC 544 and/or the WiFi AP 546 to process a new call access denial or an existing call disconnection (S122).

Figure 13:
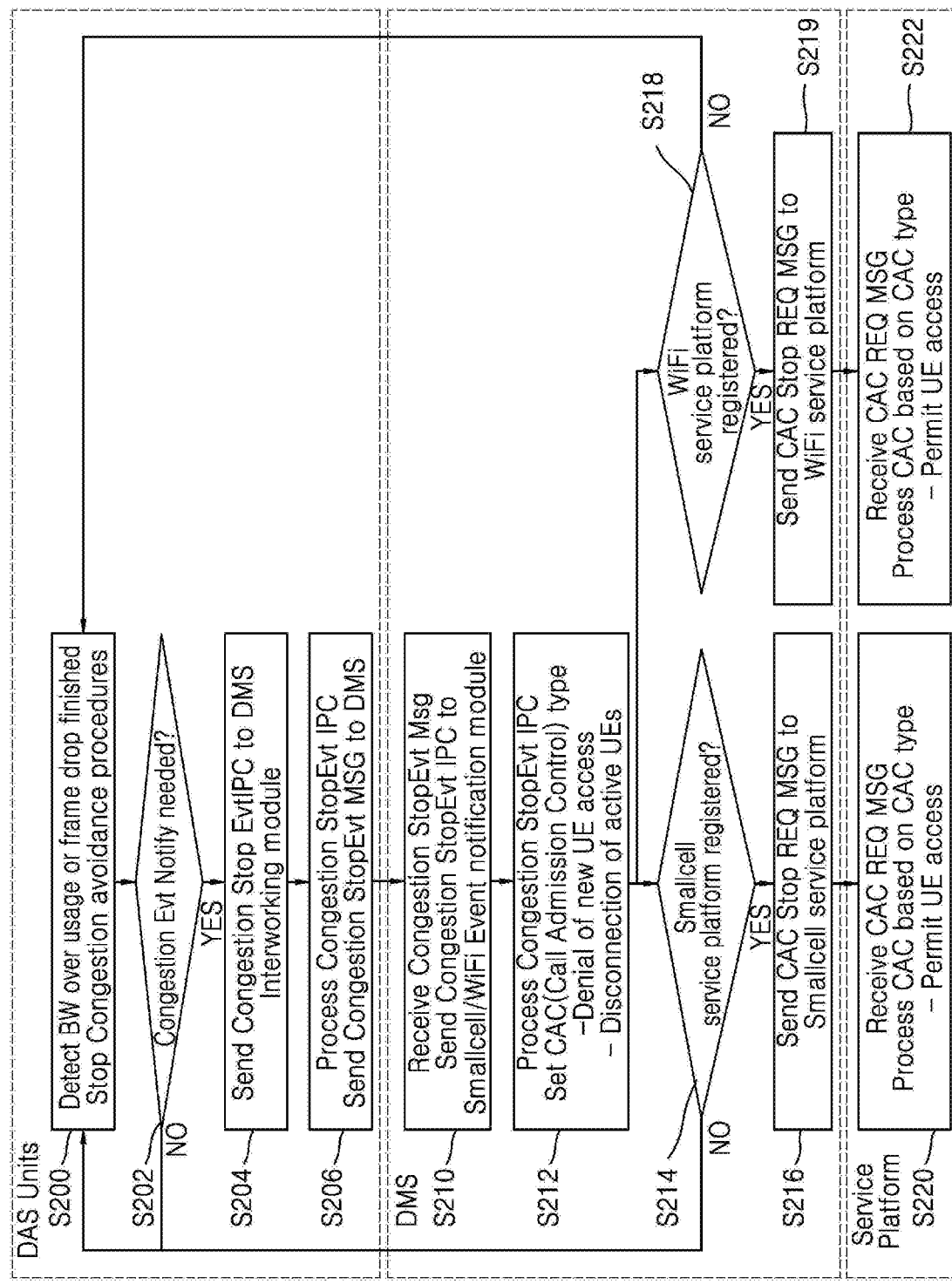
FIG. 13 is a more detailed flowchart of the end of a pre- or post-treatment for congestion in a distributed antenna system, according to an embodiment of the present invention.

FIG. 13 is a more detailed flowchart of the end of a pre- or post-treatment for congestion in a distributed antenna system, according to an embodiment of the present invention.

Referring to FIGS. 11 to 13, the QoS monitoring module 514 may monitor an Ethernet bandwidth usage rate (BW over usage) and dropped transmitted Ethernet frame counts (frame drop) per output port and generate a stop event for a congestion prediction situation or a congestion situation when the Ethernet bandwidth usage rate is lower than a threshold value or transmitted Ethernet frame dropping is stopped according to the monitoring result, thereby stopping a congestion avoiding procedure (S200). Here, the stop event for the congestion prediction situation or the congestion situation is referred to as a congestion stop event (congestion stop Evt) for stopping a new call access denial or an existing call disconnection.

The QoS monitoring module 514 may determine whether to transmit the congestion stop event to the DMS 520 (S202). When it is not necessary to transmit the congestion stop event to the DMS 520 (No in operation S202, for example, when it is determined that there is a possibility that the congestion situation may occur again), operation S200 may be performed again.

When it is necessary to transmit the congestion stop event to the DMS 520 (Yes in operation S202), the QoS monitoring module 514 may transmit congestion stop event IPC to the DMS interworking module 512 (S204).

The DMS interworking module 512 may process (protocol conversion) the congestion stop event IPC to generate a congestion stop event MSG and transmit the congestion stop event MSG to the DMS 520 (S206).

The DAS interworking module 524 of the DMS 520 may receive the congestion stop event MSG and transmit the congestion stop event IPC according to the congestion stop event MSG to the smallcell/WiFi event notification module 522 (S210).

The smallcell/WiFi event notification module 522 may set a CAC type according to whether the congestion stop event IPC is a stop event for a congestion prediction event or a stop event for a congestion event (S212).

The smallcell/WiFi event notification module 522 may determine which smallcell service platform or WiFi service platform to request processing according to a congestion prediction event or a congestion event, based on port information of the congestion stop event IPC.

The smallcell/WiFi event notification module 522 determines whether the determined smallcell service platform is registered in the distributed antenna system 500 (S214), and when the determined smallcell service platform is not registered in the distributed antenna system 500 (No in operation S214), operation S200 may be performed again.

When the determined smallcell service platform is registered in the distributed antenna system 500 (Yes in operation S214), the smallcell/WiFi event notification module 522 may transmit a CAC stop request message to the smallcell service platform 530 (S216).

The CAC stop request message is a message for requesting stopping of a new call access denial or an existing call disconnection, and may include a CAC type, port information, and the like.

The management system 532 has received the CAC stop request message may control the smallcell base station 536 and/or the HeNB/HNB gateway 534 to stop a new call access denial or an existing call disconnection according to the CAC type (S220).

The smallcell/WiFi event notification module 522 determines whether the determined WiFi service platform is registered in the distributed antenna system 500 (S218), and when the determined WiFi service platform is not registered in the distributed antenna system 500 (No in operation S218), operation S200 may be performed again.

When the determined WiFi service platform is registered in the distributed antenna system 500 (Yes in operation S218), the smallcell/WiFi event notification module 522 may transmit a CAC stop request message to the WiFi service platform 540 (S219).

The management system 542 has received the CAC stop request message may control the AC 544 and/or the WiFi AP 546 to stop a new call access denial or an existing call disconnection (S222).

The method according to the present invention may be embodied as computer-readable codes on a non-transitory computer-readable recording medium. The non-transitory computer-readable recording medium is any recording medium that can store data which can thereafter be read by a computer system. The non-transitory computer-readable recording medium may include, for example, read-only memory (ROM), random-access memory (RAM), magnetic tapes, magnetic disks, flash memory, optical data storage devices, etc. The non-transitory computer-readable recording medium can also be distributed over computer network-coupled computer systems so that a computer-readable code is stored and executed in a distributive manner.

While the embodiments have been particularly shown and described, it will be understood by those of ordinary skill in the art that various changes in form and details may be made therein without departing from the spirit and scope of the present invention as defined by the appended claims.

The invention claimed is:

1. A method of processing frames in a distributed antenna system, the method comprising:
adding a quality of service (QoS) tag,
which is a value corresponding to a type of the frames, to header information of at least one frame that does not include the QoS tag, from among the frames, based on a preset frame classification rule;
performing a frame scheduling for determining a transmission priority of the frames based on the QoS tag of each of the frames; and
dropping or transmitting the frames according to a result of the frame scheduling.

2. The method of claim 1, further comprising:
dropping the frames according to a frame policer related to a transmission rate limitation of the frames.

3. The method of claim 1, further comprising:
allocating the frames to an output port corresponding to a destination tag of the header information.

4. The method of claim 3, wherein the performing of the frame scheduling comprises:
aligning the frames allocated to the output port based on the QoS tag of each of the frames; and
aligning frames having an identical QoS tag based on a frame scheduler rule.

5. A method of controlling congestion in a distributed antenna system (DAS), the method comprising:
dropping or transmitting, by a system unit, frames based on a quality of service (QoS) tag of each of the frames;
generating, by the system unit, event information associated with the congestion based on information accumulated by dropping or transmitting the frames; and
processing, by a DAS management system, a new call access denial or an existing call disconnection according to the event information,
wherein the system unit is any one of a headend, a hub and a radio unit (RU) of the DAS.

6. The method of claim 5, wherein the information comprises transmitted Ethernet frame counts and an Ethernet bandwidth usage rate with respect to a corresponding port, and
wherein the Ethernet bandwidth usage rate is a ratio of the transmitted Ethernet frame counts to maximum transmitted Ethernet frame counts of the corresponding port.

7. The method of claim 6,
wherein the generating of the event information comprises:
generating congestion prediction event information indicating situations where the congestion is predicted, when the Ethernet bandwidth usage rate remains equal to or higher than a first threshold value; and
generating congestion event information indicating situations where the congestion is occurred, when the transmitted Ethernet frame counts remain equal to or higher than a second threshold value.

8. The method of claim 7, further comprising:
setting, by the DAS management system, a call admission control (CAC) type indicating the new call access denial or the existing call disconnection according to the event information.

9. The method of claim 7, wherein the event information comprises port information corresponding to the information, and wherein the method further comprises:

transmitting, by the DAS management system, the event information to a smallcell service platform and/or a WiFi service platform according to the port information.

10. A distributed antenna system (DAS) comprising:

a system unit configured to drop or transmit frames based on a quality of service (QoS) tag of each of the frames, and to generate event information associated with congestion based on information accumulated by dropping or transmitting the frames, wherein the system unit is any one of a headend, a hUB and a radio unit (RU); and a DAS management system configured to generate a request message for processing a new call access denial or an existing call disconnection according to the event information.

11. The DAS of claim 10, wherein the DAS management system is configured to set a call admission control (CAC) type indicating the new call access denial or the existing call disconnection according to the event information.

12. The DAS of claim 10, wherein the information comprises transmitted Ethernet frame counts and an Ethernet bandwidth usage rate with respect to a corresponding port, and wherein the Ethernet bandwidth usage is a ratio of the transmitted Ethernet frame counts to maximum transmitted Ethernet frame counts of the corresponding port.

13. The DAS of claim 12, wherein the system unit is further configured to:

generate congestion prediction event information indicating situations where the congestion is predicted, when the Ethernet bandwidth usage rate remains equal to or higher than a first threshold value, and generate congestion event information indicating situations where the congestion is occurred, when the transmitted Ethernet frame counts remains equal to or higher than a second threshold value.

14. The DAS of claim 10, wherein the event information comprises port information corresponding to the information, and wherein the DAS management system is further configured to transmit the event information to a smallcell service platform and/or a WiFi service platform according to the port information.

* * * * *